July 26, 1927.
F. G. GRIGGS
1,636,936
CULTIVATOR
Filed Nov. 21, 1925
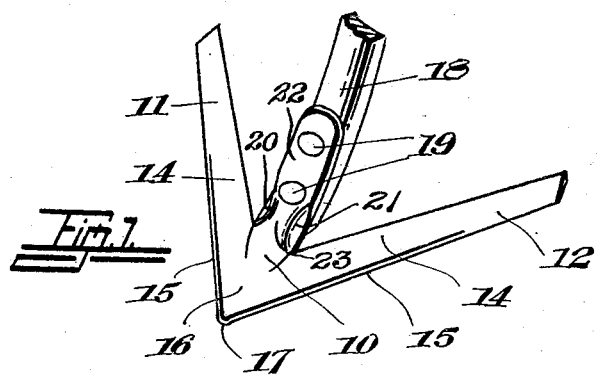
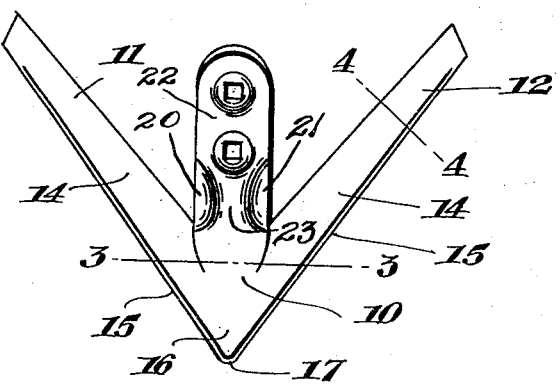
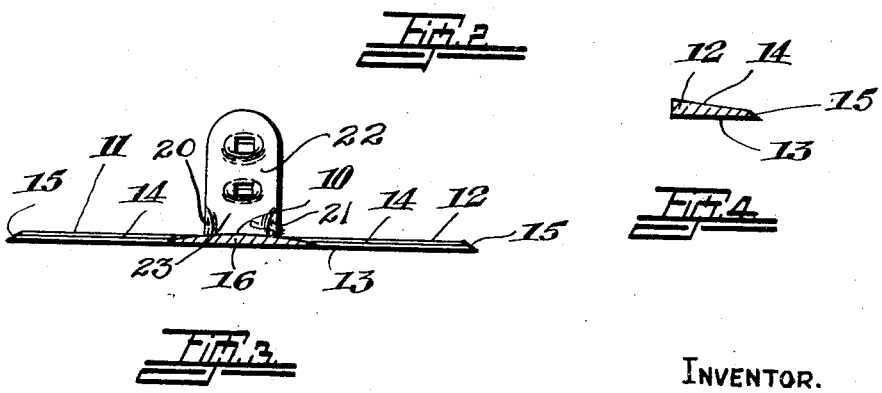
INVENTOR.
FRANCIS. G. GRIGGS.
BY Fetherston Taylor & Co.
ATT'YS Patented July 26, 1927.

1,636,936

UNITED STATES PATENT OFFICE.

FRANCIS GERMAN GRIGGS, OF ROSETOWN, SASKATCHEWAN, CANADA.

CULTIVATOR.

Application filed November 21, 1925. Serial No. 70,601.

This invention relates to improvements in cultivators and more particularly to improvements in skeleton weed cultivators and the objects of the invention are to provide a simply constructed and efficient means in the form of a foot for cultivators whereby in sowing seed at a depth of two and one-half inches the drill can be fallowed with this foot at a lesser depth, say one and one-half inches, and whereby the weeds will not only be cleaned up but the formation of the foot will tend to press the earth more firmly around the seed thus insuring a more even germination and leaving a dust blanket on top.

Further objects are to provide an implement of this character that will leave the land less ridged than any other foot heretofore in use.

Still further objects are the provision of a device of this character that will clean ground at a much shallower depth than heretofore so that one can sow first and cultivate after seeding is done, thereby securing the destruction of the weeds at a later date than otherwise.

With the foregoing and other objects in view, the invention consists essentially of a V-shaped metal foot member formed with flat under sides having cutting outer edges and intermediately provided with a curved stem having openings therein to receive securing means whereby the foot is bolted to the cultivator shank.

Referring now to the drawings in which like characters of reference indicate corresponding parts in each figure, Figure 1 is a perspective view of the improved cultivator foot, Figure 2 is a plan view of the same, Figure 3 is a section on line 3—3 of Figure 2, and Figure 4 is a section on line 4—4 of Figure 2.

Referring more particularly to the drawings, 10 designates the foot substantially V-shaped, the sides of which 11 and 12 are formed flat on the underside as at 13, see Figure 4, to press evenly on the ground.

It will be noted also from Figure 4 that the sides are of greater thickness on the inside than on the outside, sloping on the top from the inside outwardly as at 14. The outer edges 15 of the sides 11 and 12 are also sharpened to form cutting edges while the apex 16 is, on the outside joining with the cutting edges, rounded at 17. In the centre, between the sides 11 and 12, is a suitably curved stem 18 formed with openings therein to receive bolts 19 whereby the foot is secured to the curved stem or shank of a cultivator. 20 and 21 are recesses formed in opposite sides of the arm 22 while between these recesses as at 23 the surface of the stem is convex to act in combination with the outwardly sloped surface of the wings to readily throw off the earth when the cultivator is in operation, thus enabling the cultivator to be more readily and efficiently used at any required depth.

As many changes could be made in the above construction and many apparently widely different embodiments of my invention, within the scope of the claim, constructed without departing from the spirit or scope thereof, it is intended that all matter contained in the present specification and accompanying drawings be interpreted in an illustrative and not in a limiting sense.

What I claim as my invention is:

A cultivator blade comprising a substantially V-shaped plate formed with a flat under surface and an outwardly and downwardly slanting upper surface, a curved central shank integral with the plate and having formed adjacent the blade in the forward surface thereof at each side substantially semi-circular recessed portions and a rounded ridge between said recesses whereby, in combination with the outwardly slanting top surface of the plate, the soil in operation is more readily and with less draft thrown off.

In witness whereof I have hereunto set my hand.

FRANCIS GERMAN GRIGGS.